Dec. 8, 1964  R. T. TALTON, JR., ETAL  3,159,997
TEST BURNER
Filed July 10, 1961  3 Sheets-Sheet 1

INVENTORS
Roland Talton &
Kenneth Johnson
BY Martha L. Ross
AGENT

Dec. 8, 1964  R. T. TALTON, JR., ETAL  3,159,997
TEST BURNER
Filed July 10, 1961  3 Sheets-Sheet 3

INVENTORS
Roland Talton &
Kenneth Johnson

BY Martha L. Ross
AGENT

United States Patent Office 3,159,997
Patented Dec. 8, 1964

3,159,997
TEST BURNER
Roland T. Talton, Jr., Falls Church, and Kenneth D. Johnson, Vienna, Va., assignors to Atlantic Research Corporation, county of Fairfax, Va., a corporation of Virginia
Filed July 10, 1961, Ser. No. 122,994
7 Claims. (Cl. 73—35)

The present invention relates to high pressure test cells for determining the burning properties of propellants having windows designed to permit clear observation of propellant strand burning or similar tests. By this device, phenomena of burning surface, flame characteristics, products of combustion, transition of the solid phase to the gaseous phase, and strand burning rates may be observed visually or recorded by high-speed photography. The photographic recording of burning of a solid propellant strand to determine its burning rates and phenomena of burning surface is a particular application of this device.

Heretofore optical test cells have generally been effective only up to about 2000 pounds' pressure and difficulties were encountered in observing or obtaining an effective photographic record of the burning of the strand due to the distance from the strand to the windows. However, if the windows were moved much closer to the combustion zone, spatter of combustion products onto the glass would undesirably cloud the glass and require frequent replacement of the windows. Also, such prior optical test cells have not provided enough light on the test subject to provide records or observation of the desired quality.

An object of the present invention is the provision of a novel test cell construction for observing or recording features of combustion tests and the like having improved versatility and operational characteristics.

Another object of the present invention is the provision of a novel test cell construction for observing or recording features of propellant combustion tests and the like having means facilitating introduction and removal of test specimens.

Another object of the present invention is the provision of a novel test cell construction for observing or recording features of propellant combustion tests and the like wherein windows are disposed very close to the combustion zone providing maximum visual inspection and observation and photographic recording.

Another object of the present invention is the provision of a novel test cell construction for observing or recording features of propellant combustion tests and the like having novel window assemblies disposed very close to the combustion zone including means for protecting the windows against fogging and disposable means protecting window assembly components from damage by combustion products.

Other objects, advantages and capabilities of the present invention will become apparent from the following detail description, taken in conjunction with the accompanying drawings illustrating one preferred embodiment of the invention.

Figure 1:
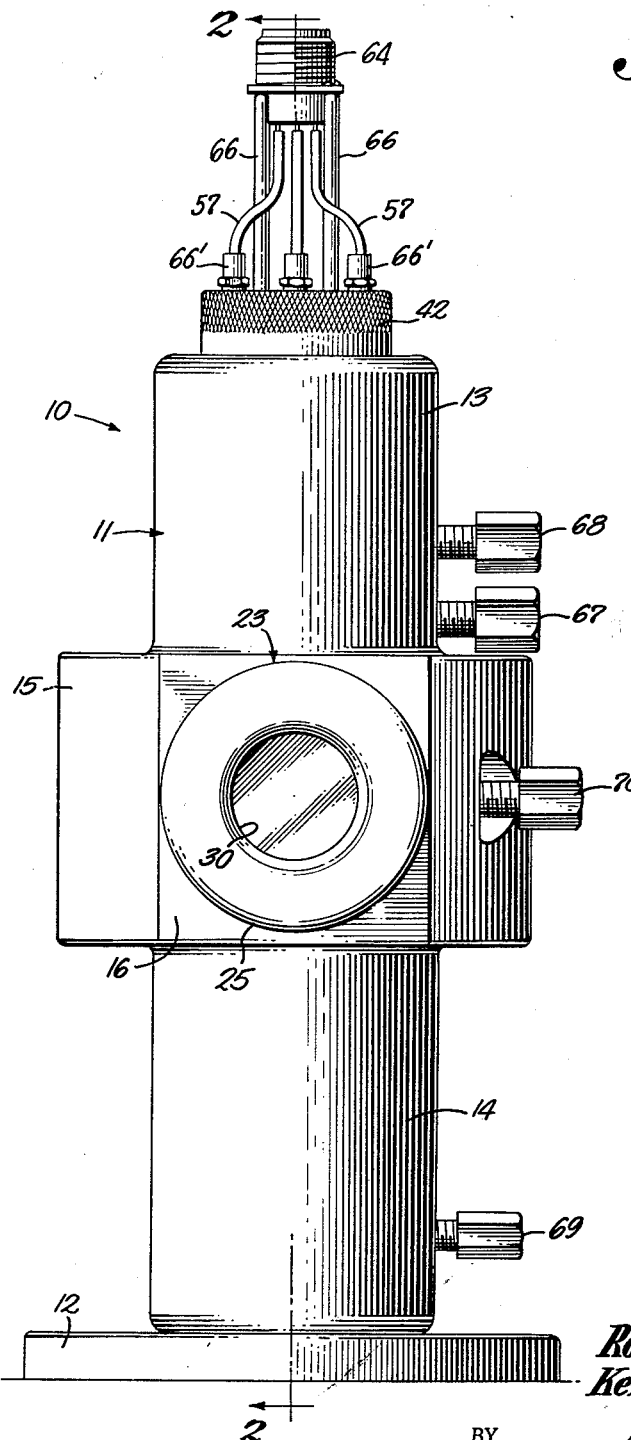
FIGURE 1 is a front elevation of an optical bomb or test cell embodying the present invention.
Figure 2:
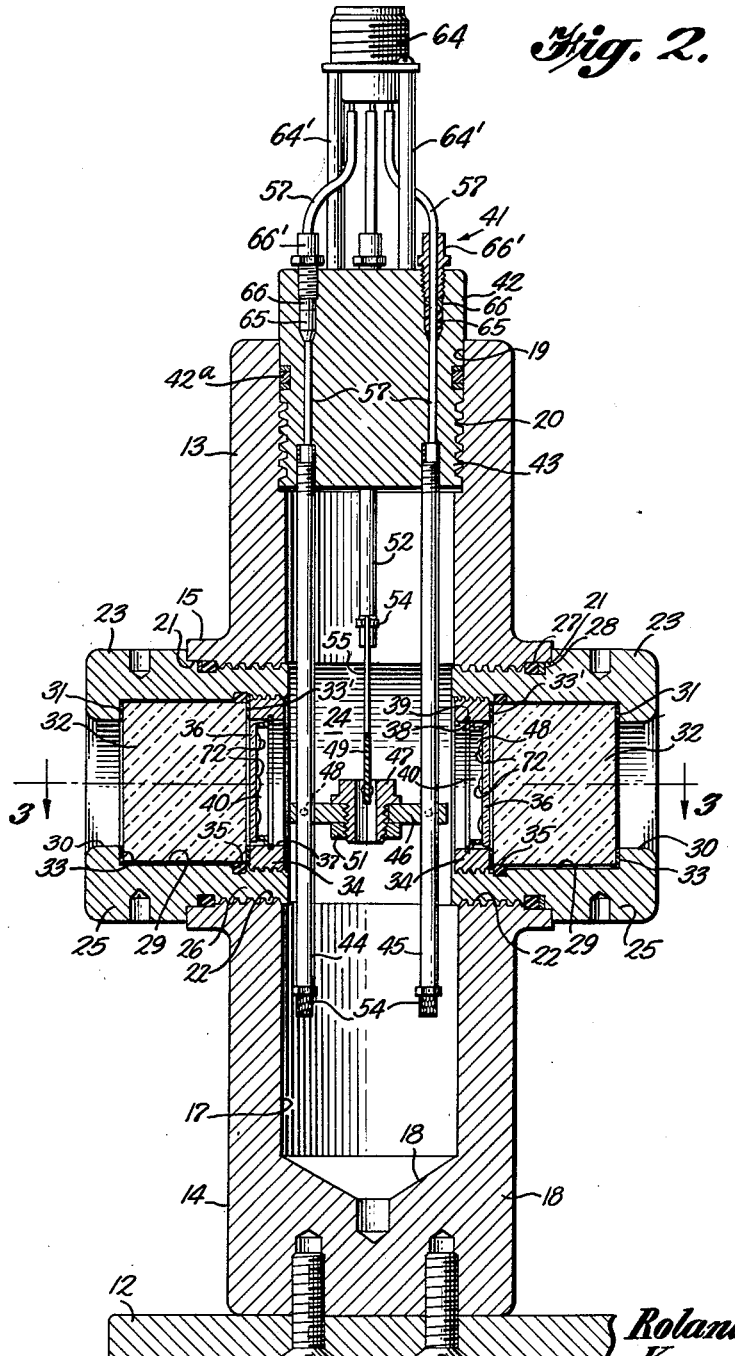
FIGURE 2 is a vertical section view thereof taken along the line 2—2 of FIGURE 1.
Figure 3:
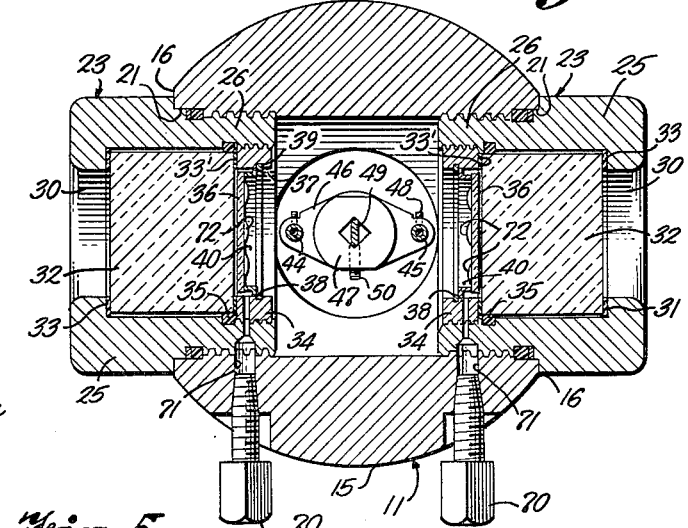
FIGURE 3 is a horizontal section view taken along the line 3—3 of FIGURE 2.
Figure 4:
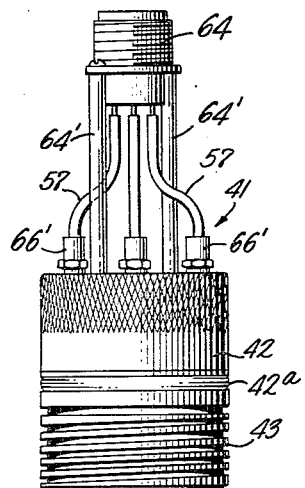
FIGURE 4 is a side elevation of the specimen holder head assembly.
Figure 5:
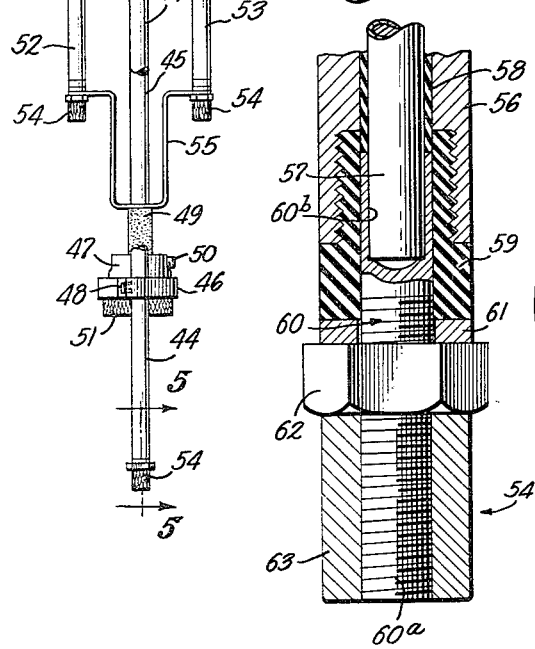
FIGURE 5 is a section view of the terminal portion of a support rod of the head assembly taken along the line 5—5 of FIGURE 4.
Figure 6:
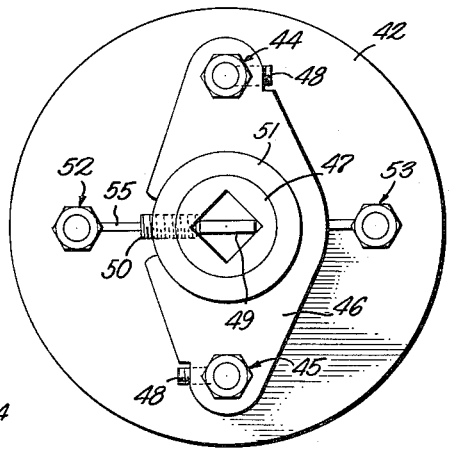
FIGURE 6 is a bottom view of the head assembly.

Referring to the drawings illustrating an exemplary embodiment of the invention, wherein like reference characters designate corresponding parts throughout the several figures, the optical bomb or test cell, indicated generally by the reference character 10, comprises a vertically elongated body 11 of generally cylindrical configuration secured, as by screws or the like, on an enlarged pedestal or base 12, and having upper and lower elongated cylindrical portions 13 and 14 respectively, and a cylindrical mid portion 15 of larger diameter having diametrically opposed flats 16. The body 11 has an axially extending bore or chamber 17 which is closed at its lower end as indicated at 18 and opens through the upper end of the body 11 as indicated at 19, the open upper end 19 of the bore 17 being bounded by threads 20. The enlarged diameter mid portion 15 is also provided with axially aligned openings 21 extending along a horizontal diametrical axis of the bore 17 having internal threads 22 for removably mounting window assemblies 23 through which the combustion region or zone 24 of the bore 17 may be viewed or photographed.

The two window assemblies 23 illustrated in the drawing are identical in construction so that a detailed description of one will suffice. Each window assembly 23 comprises an annular viewing glass holder 25 having an externally threaded constricted portion 26 to be threadedly received into one of the horizontally aligned openings 21 in the mid portion 15 of the cell body 11, the constricted portion 26 having an annular seating recess for receiving a resilient O-ring 27 and a back-up ring 28 to provide a pressure-tight seal between the sight glass holder 25 and the mating surfaces of the opening 21 in the cell body 11. The holder 25 has an inwardly opening sight glass accommodating bore 29 aligned with a constricted sight opening 30 in the outer end of the holder 25, the annular region of the holder 25 bounding the sight opening 30 having an inwardly facing annular stop surface 31. A thick sight glass 32, which in the preferred embodiment is a fused silica sight glass two inches thick is seated in the glass accommodating bore 29 and is limited against outward movement axially of the holder 25 by the stop surface 31, the sight glass being cushioned by a gasket 33, which may be soft silver, interposed between the stop surface 31 and the peripheral zone of the sight glass 32. An externally threaded retainer ring 34 is threaded into complementary internal threads in the inner end portion of the bore 29 of the glass holder 25 to firmly retain the sight glass 32 in the bore 29, another cushioning gasket 33' similar in construction to the gasket 33 being interposed between the adjacent surfaces of the retainer ring 34 and sight glass 32. The periphery of the fused silica sight glass 32 is sealed by a resilient O-ring 35 seated in a suitable annular groove in the surface bounding the glass accommodating bore 29.

In order to protect the inwardly facing surface of the fused silica sight glass 32 from damage by combustion products, the inwardly facing surface of each sight glass 32 is covered by a disposable spatter glass 36 in the shape of a thin circular disk, which is preferably a relatively inexpensive glass disk such as a safety goggle glass. The spatter glass 36 is retained in position within the bore 37 of the retainer ring 34 by a snap-type retaining ring 38 which snaps into a suitable inwardly opening retaining groove 39 in the retaining ring 34 and an annular spacer 40 located between the snap-type retaining ring 38 and the spatter glass 36 which is restrained within the bore of the retaining ring 34 by the ring 38 and bears against the inwardly facing surface of the spatter glass 36 adjacent the periphery thereof.

The head assembly, indicated generally by the reference character 41, for supporting the test specimen to be burned in the combustion zone 24 of the bore or chamber 17, which test specimen 49 will be assumed to be a thin strip of solid propellant material, and comprises a generally cylindrical head 42 having external threads 43 along the lower portion thereof to be fitted into the open upper end 19 of the bore 17 in engagement with the threads 20. Two long posts or supporting rods 44 and 45 are fixed in the head 42 and depend therefrom to a level below the window assemblies 23 to form supporting guides for a platform-like bracket 46 having a sample holder 47 thereon. The bracket 46 has apertures for slidably receiving the supporting rods 44, 45 together with set screws 48 to extend into engagement with supporting rods 44, 45 and lock the bracket at a selected level. The sample holder 47 in the preferred embodiment also has an upwardly opening socket substantially in the center thereof for receiving a test specimen, such as the propellant material strip 49, and a set screw 50 communicating with the socket to fix the test strip in the sample holder 47. Obviously other conventional sample holders may be provided such as a chuck-type sample holder. The sample holder 47 may be removably secured to the bracket 46, for example by forming a threaded depending stub on the sample holder which extends through an actuating aperture in the bracket 46 and is fixed in position thereon by a lock ring 51.

A pair of short posts or support rods 52, 53 are also fixed to and depend from the head 42, the support rods 52, 53 having coupling units 54 at their outer or lower ends to permit an igniter wire 55 to be fixed to the post and extend therebetween into contact with the upper ridge of the test strip 49. The lower ends of the posts or rods 44, 45 also have coupling units 54 at their lower ends to permit attachment of thermocouples or other desired electrical devices thereto.

The support rods 44, 45, 52 and 53 are of similar construction, each comprising a hollow tube 56 through which a conductor wire 57 may extend to a point adjacent the lower end of the tube 56, the wire 57 being insulated from the tube 56 by a sheath of insulating material 58. At the lower end of each of the supporting rods is an insulator 59 which is threaded into an internally threaded enlarged bore at the end of the tube 56. A contact member 60 having a threaded section 60a and a cup-shaped section 60b which embraces and is in intimate contact with the end of the wire 57 in the axial region spanned by the insulator 59 is located at the lower end of each support rod. A lock washer 61 is fitted over the threaded lower section 60a, followed by a hex nut 62 and a knurled fastener 63 threaded onto the section 60a.

The conductor wires 57 in the support rods 44, 45, 52 and 53 extend above their associated support rods through suitable bores in the head 42 and are connected to the contacts of a multi-contact connector receptacle 64 supported at an elevated position above the head 42 by connector support rods 64'. A high-pressure sealing fitting is provided where each of the conductor wires 57 exit from the head 42, including a deformable sleeve 65 surrounding the wire 57 and sheath 68 in an enlarged upper portion of the bore through which the wire passes, a steel follower 66 surrounding the wire 57 and sheath 58 above the sleeve 65, and packing gland nut 66' threaded into the enlarged upper bore portion to seat on and exert downward pressure upon the follower 66 to compress the sleeve 65 in the enlarged bore portion and form a high pressure seal. The follower 66 preferably has a conical recess in the lower end thereof, as shown, to facilitate compressing of the sleeve 65 into tightly sealing condition about the wire 57 and sheath 58. A resilient O-ring 42a is also provided in a suitable peripheral groove in the head 42 to seal the joint between the head 42 and the upper end 19 of the bore 17.

In the burning of the test specimen, it is desired to conduct the combustion test in an atmosphere of inert gas under high pressure, and to this end a threaded inlet fitting 67 and communicating inlet bore is provided to introduce inert gas such as nitrogen gas into the bore 17, and an outlet fitting 68 and communicating outlet bore are provided together with a conventional valving arrangement for withdrawing the inert gas from the bore 17 at the conclusion of the test. An additional outlet fitting 69 communicating with the lower portion of the bore 17 is provided to exhaust over-pressure gas and maintain constant pressure in the bore 17.

Means are also provided for directing inert gas such as nitrogen gas under pressure across the inner surfaces of the spatter glasses 36 to prevent fogging and maintain these surfaces of the window assemblies clear during the test. To this end, a gas inlet fitting 70 and communicating bore 71 is provided adjacent each of the window assemblies 23 in the enlarged diameter mid portion 15 of the cell body 11. The bore 71 has registered portions in the constricted portion 26 of each holder 25 and the retaining ring 34 to admit inert gas such as nitrogen gas to the zone immediately inwardly of the spatter glasses 36. The spacers 40 are also provided with scalloped edges as indicated at 72 adjacent the spatter glasses 36 providing openings through which the nitrogen gas may pass to extend across the front of the inner surface of the adjacent spatter glass and prevent fogging thereof.

In the use of the apparatus, the test specimen such as a thin rectangular strip of solid propellant material will be inserted in the socket for receiving the same provided in the sample holder 47 while the head assembly 41 is removed from the body 11, the igniter wire 55 will be mounted on the support rods 52, 53 and shaped so that it engages the upper edge of the test specimen 49, the thermocouples or other electrical devices, if any, mounted on the lower ends of the long support rods 44, 45, and the head assembly threaded into the upper end of the test cell body 11. The bracket 46 supporting the sample holder 47 will have been previously adjusted axially of the supporting rods 44, 45 so as to locate the test strip 49 within the field of view of sight glasses 32. A conventional valve controlling admission of high-pressure nitrogen gas will then be opened to admit nitrogen gas under pressure to the test bore 17 through the inlet fitting 67 and the igniter wire 55 will then be energized to ignite the solid propellant test strip 49. During the burning of the test strip 49, phenomena such as the burning rate, the configuration of the burning surface, flame characteristics, the products of combustion, the transition of the solid phase to the gaseous phase, and like features may readily be observed visually or recorded by high-speed photography. Although the sight glasses 32 are disposed very close to the combustion zone 24, the two inch fused-silica sight glasses will be protected against damage by combustion products by the spatter glasses 36 and the spatter glasses will be effectively prevented from fogging or becoming otherwise obscured by reason of the nitrogen gas extending radially inwardly along the inner surfaces of the spatter glasses from the inlet fittings 70 and through the openings provided by the scalloped edges 72 of the spacers 40. Upon completion of the combustion test, the high-pressure nitrogen gas may then be withdrawn from the test cell bore 17 through the outlet fitting 68 and the specimen holder assembly 41 withdrawn from the bore 17 for insertion of a new test strip. An example of such test cell apparatus providing a bore 17 of 2.750 inches diameter and 10.375 inches length with two inch fused-silica sight glasses have been operated effectively with working pressures up to 5000 p.s.i. and with an optical path length from the central vertical axis of the bore to the spatter glass of about 1.8 inches. The configuration of the window assemblies, the thick cylindrical character of the sight glasses 32, and the shape and positioning of the sealing gaskets all contribute to the attainment of the high pressures realized with this construction.

While but one preferred example of the present invention has been particularly shown and described, it is apparent that various modifications may be made therein within the spirit and scope of the invention, and it is desired, therefore, that only such limitations be placed on the invention as are imposed by the prior art set forth in the appended claims.

What is claimed is:

1. A high pressure test cell for observing and recording phenomena during combustion of solid propellant specimens and the like comprising a vertically elongated, thick walled pressure vessel body of generally cylindrical configuration having an upwardly opening well extending axially through the major portion of the height of said body, said well having an open upper end, a bottom and a combustion zone intermediate said bottom and open upper end, said body having aligned openings therein along a transverse axis intercepting said combustion zone, a sight glass assembly at each of said openings permitting continuous optical monitoring of phenomena in the combustion zone including a sight glass holder removably secured in said openings and a thick cylindrical sight glass removably mounted in said holder in axial alignment with its associated opening having an inner surface disposed immediately adjacent said combustion zone, a thin corrosion-resistant transparent spatter glass removably supported in said holder adjacent the inner surface of said sight glass, a specimen supporting assembly removably supported in said well including a head portion forming a closure for the upper end of said well having means for removably coupling the head portion with said body and sealing means for sealing the upper end of said well, a plurality of transversely spaced parallel elongated supports depending from said head portion at least through said combustion zone, a specimen holder adjustably mounted on said supports for adjustment axially of said well having means for releasably supporting a propellant test specimen in the field of view of said sight glass, means depending from said head portion for supporting igniting means at a position relative to the test specimen to effect ignition thereof, and externally accessible electrical connector means extending from said igniting means through said head portion.

2. A high pressure test cell for observing and recording phenomena during combustion of solid propellant specimens and the like comprising a vertically elongated, thick walled pressure vessel body of generally cylindrical configuration having an upwardly opening well extending axially through the major portion of the height of said body, said well having an open upper end, a bottom and a combustion zone intermediate said bottom and open upper end, said body having aligned openings therein along a transverse axis intercepting said combustion zone, a sight glass assembly at each of said openings permitting continuous optical monitoring of phenomena in the combustion zone including a sight glass holder removably secured in said openings and a thick sight glass removably mounted in said holder in axial alignment with its associated opening having an inner surface disposed immediately adjacent said combustion zone, means for discharging an inert gas under pressure radially inwardly adjacent the inner face of said sight glass from a plurality of circumferentially spaced points adjacent the periphery thereof to retard fogging, a specimen supporting assembly removably supported in said well including a head portion forming a closure for the upper end of said well having means for removably coupling the head portion with said body and sealing means for sealing the upper end of said well, a plurality of transversely spaced parallel elongated supports depending from said head portion at least through said combustion zone, a specimen holder adjustably mounted on said supports for adjustment axially of said well having means for releasably supporting a propellant test specimen in the field of view of said sight glass, means depending from said head portion for supporting igniting means at a position relative to the test specimen to effect ignition thereof, an externally accessible electrical connector means extending from said igniting means through said head portion.

3. A high pressure test cell for observing and recording phenomena during combustion of solid propellant specimens and the like comprising a vertically elongated, thick walled pressure vessel body of generally cylindrical configuration having an upwardly opening well extending axially through the major portion of the height of said body, said well having an open upper end, a bottom and a combustion zone intermediate said bottom and open upper end, said body having aligned openings therein along a transverse axis intercepting said combustion zone, a sight glass assembly at each of said openings permitting continuous optical monitoring of phenomena in the combustion zone including a sight glass holder removably secured in said openings and a thick sight glass removably mounted in said holder in axial alignment with its associated opening having an inner surface disposed immediately adjacent said combustion zone, a thin corrosion-resistant transparent spatter glass removably supported in said holder adjacent the inner surface of said sight glass to protect the latter against damage by combustion products, means for discharging an inert gas under pressure radially inwardly over the inner surface of said transparent spatter glass from a plurality of circumferentially spaced points adjacent the periphery thereof to retard fogging, a specimen supporting assembly removably supported in said well including a head portion forming a closure for the upper end of said well having means for removably coupling the head portion with said body and sealing means for sealing the upper end of said well, a plurality of transversely spaced parallel elongated supports depending from said head portion at least through said combustion zone, a specimen holder adjustably mounted on said supports for adjustment axially of said well having means for releasably supporting a propellant test specimen in the field of view of said sight glass, means depending from said head portion for supporting igniting means at a position relative to the test specimen to effect ignition thereof, and externally accessible electrical connector means extending from said igniting means through said head portion.

4. A high pressure test cell for observing and recording phenomena during combustion of propellant test specimens and the like comprising a pressure vessel body having an upwardly opening well arranged along a vertical axis therein enclosed at the side and bottom by said body, said well including a combustion zone intermediate the bottom and open upper end thereof, at least one sight glass assembly located in alignment with said combustion zone to afford observation of the combustion zone including a sight glass holder supported on said body and a thick sight glass removably mounted in said holder having an inner surface disposed immediately adjacent said combustion zone, means for discharging an inert gas under pressure radially inwardly adjacent the inner face of said sight glass from a plurality of circumferentially spaced points adjacent the periphery thereof to retard fogging, a specimen supporting assembly removably supported in said well including a head portion forming a closure for the upper end of said well having means for removably coupling the head portion with the portion of said body bounding the upper end of the well and means for sealing the upper end of said well, at least one elongated support member depending from said head portion at least through said combustion zone, a specimen holder mounted on said elongated support member having means for supporting a test specimen in the field of view of said sight glass, and means for supporting igniting means at a position relative to the test specimen to effect ignition thereof.

5. A high pressure test cell for observing and recording phenomena during combustion of propellant test specimens and the like comprising a pressure vessel body having an upwardly opening well arranged along a vertical axis therein enclosed at the side and bottom by said body, said well including a combustion zone intermediate the bottom and open upper end thereof, at least one sight glass assembly located in alignment with said combustion zone to afford observation of the combustion zone including a sight glass holder supported on said body and a thick sight glass removably mounted in said holder having an inner surface disposed immediately adjacent said combustion zone, a thin corrosion-resistant transparent spatter glass removably supported in said holder adjacent the inner surface of said sight glass to protect the latter against damage by combustion products, means for discharging an inert gas under pressure radially inwardly over the inner surface of said transparent spatter glass from a plurality of circumferentially spaced points adjacent the periphery thereof to retard fogging, a specimen supporting assembly removably supported in said well including a head portion forming a closure for the upper end of said well having means for removably coupling the head portion with the portion of said body bounding the upper end of the well and means for sealing the upper end of said well, at least one elongated support member depending from said head portion at least through said combustion zone, a specimen holder mounted on said elongated support member having means for supporting a test specimen in the field of view of said sight glass, and means for supporting igniting means at a position relative to the test specimen to effect ignition thereof.

6. A high pressure test cell for observing and recording phenomena during combustion of test specimens and the like comprising a vertically elongated pressure vessel body having an upwardly opening well extending axially through the major portion of the height of said body, said well having an open upper end, a bottom and a combustion zone intermediate said bottom and open upper end, a sight glass assembly located along a transverse axis of said body in substantial alignment with said combustion zone permitting continuous optical monitoring of phenomena in the combustion zone including a sight glass holder supported on said body and a thick sight glass removably mounted in said holder having an inner surface disposed immediately adjacent said combustion zone, means for discharging an inert gas under pressure radially inwardly adjacent the inner face of said sight glass from a plurality of circumferentially spaced points adjacent the periphery thereof to retard fogging, a specimen supporting assembly removably supported in said well including a head portion forming a closure for the upper end of said well having means for removably coupling the head portion with said body and sealing means for sealing the upper end of said well, a plurality of transversely spaced parallel elongated supports depending from said head portion at least through said combustion zone, a specimen holder adjustably mounted on said supports for adjustment axially of said well having means for releasably supporting a test specimen in the field of view of said sight glass, means depending from said head portion for supporting igniting means at a position relative to the test specimen to effect ignition thereof, and externally accessible electrical connector means extending from said igniting means through said head portion.

7. A high pressure test cell for observing and recording phenomena during combustion of test specimens and the like comprising a vertically elongated pressure vessel body having an upwardly opening well extending axially through the major portion of the height of said body, said well having an open upper end, a bottom and a combustion zone intermediate said bottom and open upper end, a sight glass assembly located along a transverse axis of said body in substantial alignment with said combustion zone permitting continuous optical monitoring of phenomena in the combustion zone including a sight glass holder supported on said body and a thick sight glass removably mounted in said holder having an inner surface disposed immediately adjacent said combustion zone, a thin corrosion-resistant transparent spatter glass removably supported in said holder adjacent the inner surface of said sight glass to protect the latter against damage by combustion products, means for discharging an inert gas under pressure radially inwardly over the inner surface of said transparent spatter glass from a plurality of circumferentially spaced points adjacent the periphery thereof to retard fogging, a specimen supporting assembly removably supported in said well including a head portion forming a closure for the upper end of said well having means for removably coupling the head portion with said body and sealing means for sealing the upper end of said well, a plurality of transversely spaced parallel elongated supports depending from said head portion at least through said combustion zone, a specimen holder adjustably mounted on said supports for adjustment axially of said well having means for releasably supporting a test specimen in the field of view of said sight glass, means depending from said head portion for supporting igniting means at a position relative to the test specimen to effect ignition thereof, and externally accessible electrical connector means extending from said igniting means through said head portion.

References Cited by the Examiner
UNITED STATES PATENTS

| | | | |
|---|---|---|---|
| 2,274,396 | 2/42 | Barry | 73—341 |
| 2,602,970 | 7/52 | Gouge | 20—56.5 |
| 2,795,738 | 6/57 | Holliday | 73—147 X |
| 2,983,135 | 5/61 | Zihlman | 73—35 |

OTHER REFERENCES

Publication: Anal. Chem. vol. 19, No. 9, pages 630–633 (1947). Article by Crawford et al.

RICHARD C. QUEISSER, *Primary Examiner.*

DAVID SCHONBERG, *Examiner.*